United States Patent [19]

Corcoran

[11] 4,076,886
[45] Feb. 28, 1978

[54] STRUCTURAL LAMINATE FOR SEATING

[75] Inventor: Jack C. Corcoran, Grand Rapids, Mich.

[73] Assignee: Sackner Products, Inc., Grand Rapids, Mich.

[21] Appl. No.: 695,939

[22] Filed: Jun. 14, 1976

[51] Int. Cl.² .......................... B32B 5/02; B32B 5/22; D04H 1/04
[52] U.S. Cl. .................................. 428/294; 428/292; 428/296; 428/298
[58] Field of Search ............... 428/294, 293, 292, 298, 428/296, 280, 189, 190, 191, 110, 109, 107, 113, 112, 114, 74, 71; 5/345 R; 156/167

[56] References Cited

U.S. PATENT DOCUMENTS

| 3,094,716 | 6/1963 | Friedman | 428/71 X |
| 3,616,142 | 10/1971 | Schrotenboer | 428/226 |
| 3,791,911 | 2/1974 | Yaeger et al. | 428/294 X |
| 3,949,130 | 4/1976 | Sabee et al. | 428/290 X |
| 3,956,783 | 5/1976 | Stoller | 5/345 R |

Primary Examiner—Lorraine T. Kendell
Attorney, Agent, or Firm—Price, Heneveld, Huizenga & Cooper

[57] ABSTRACT

The specification discloses a structural laminate and method therefor, which laminate is useful in making upholstered seats, furniture, and the like. Resilient, bendable, yet relatively stiff, reinforcing strips of a material in a self-adhering condition, preferably of an organic polymer at an elevated temperature and formed in a circular cross section, are combined between a sheet of cushioning material, preferably resinated cotton batt, and a thin sheet of nonwoven, relatively closed, preferably spun bonded covering material. The cover eliminates the need for any additional dust covering or scrim beneath upholstery while the laminate is highly resistant to wear caused by springs and yet is easily cut for assembly.

The method includes the combining of the self-adhering reinforcing strips at an elevated temperature with the cushioning and covering sheets and cooling the resulting laminate such that it sets in a predetermined orientation.

16 Claims, 4 Drawing Figures

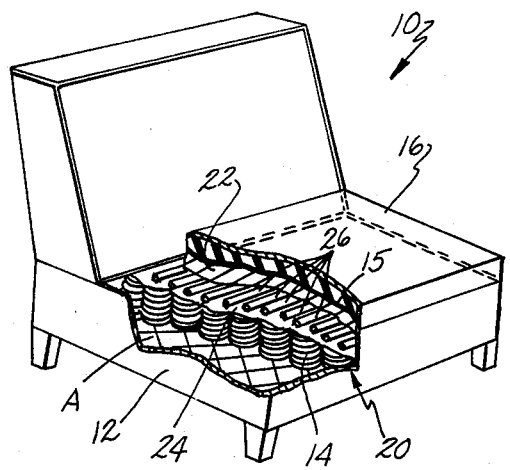

FIG. 1.

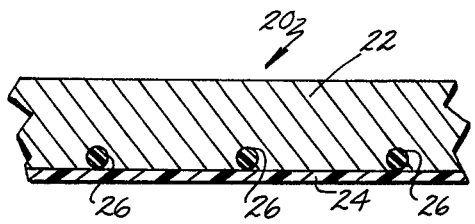

FIG. 3.

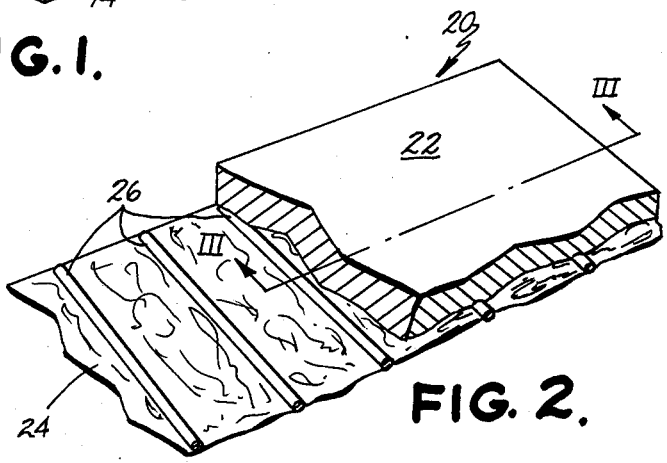

FIG. 2.

```
PROVIDING A SHEET OF CUSHIONING MATERIAL,
A SHEET OF RELATIVELY THIN COVERING MATERIAL, AND
AT LEAST ONE STIFFENING OR REINFORCING STRIP WHICH
BECOMES SELF-ADHERING AT AN ELEVATED TEMPERATURE
OR WHEN HEATED
           │
           ▼
COMBINING THE SELF-ADHERING STRIP INTERMEDIATE
THE CUSHIONING AND COVERING MATERIALS
           │
           ▼
FORCING THE SELF-ADHERING STRIP AND CUSHIONING AND
COVERING MATERIALS TOGETHER INTO A COMPOSITE LAMINATE
           │
           ▼
COOLING THE LAMINATE
```

FIG. 4.

STRUCTURAL LAMINATE FOR SEATING

BACKGROUND OF THE INVENTION

This invention relates to a structural composite laminate useful in making upholstered seats, furniture, and the like as well as to a method for manufacturing the laminate.

Conventional seating, furniture, and the like typically incorporate a frame, a layer of coil springs, some type of cushioning pad or other material over top the springs followed by a sheet of covering material upon which rest finished seat cushions or the like. An additional sheet of coverng or scrim material is typically fastened across the bottom of the furniture to both prevent dust from entering the structural areas of the seating or furniture and to prevent particles of the various pads and upholstery materials from dropping out of the seating or furniture.

In the past, the cushioning pad or material intermediate the springs and covering material has been fashioned using sinuous wire, stiffened cardboard or paper, or the like. This cushion is typically subjected to a large amount of wear because of its interaction against the springs. It must also provide a certain amount of resistance to bending, and thus some support, although it cannot be too stiff so as to provide too rigid and thus an uncomfortable seat.

Certain drawbacks have been noticed utilizing the conventionally known pads or cushioning materials. With the wire type, the interaction between the wire and the metallic springs often causes noise when the seat or furniture is used. Further, during manufacture of the seating, the wire reinforced padding or cushioning material is difficult to use since it is hard to cut into the proper size and shape and thereafter must be securely and positively tied or fastened because of its strong resiliency. Other types of cushioning materials which do not use wire have been found to wear out quickly because of the rubbing action of the springs thereby reducing the life of the seat.

One specific type of cushioning material which has gone far to solve the above problems is a structural laminate for seating disclosed in U.S. Pat. No. 3,616,142, entitled STRUCTURAL LAMINATE FOR SEATING AND THE LIKE, issued Oct. 26, 1971, invented by Albert Schrotenboer, and assigned to the same asignee as the present invention. This laminate utilizes a layer of cushioning material and a bottom layer formed of a plurality of spaced strips of folded paper held against one side of the cushioning material by a loosely woven or knitted web of starched, woven material. While this cushioning material has functioned well, it is rather tedious and difficult to manufacture since it requires the use of adhesives at various points within the manufacturing process in order to retain the various layers together. The folded paper strips and loosely woven strips also have not been extremely highly wear resistant. Moreover, the laminate described in U.S. Pat. No. 3,616,142, as well as the wire-reinforced and other types of prior known cushioning materials, have all required the use of the additional scrim material beneath the upholstered seating in order to prevent particles of the cushioning and other upholstery materials from dropping out of the furniture.

Accordingly, there has been a need for an improved cushioning material useful in making upholstered seating, furniture, and the like which is extremely durable and wear resistant, may be easily cut for inclusion in upholstery, overcomes the other problems mentioned above, and yet is easy, simple, and inexpensive to manufacture.

SUMMARY OF THE INVENTION

Accordingly, the present invention provides an improved structural laminate useful for making upholstered seating, furniture, and the like, in vehicles and other applications, which essentially includes a relatively thick sheet of cushioning material, a plurality of spaced, bendable yet relatively stiff and resilient, elongated, reinforcing strips bonded to one surface of the sheet, and a relatively thin, relatively closed sheet of covering material applied over the spaced strips. The spaced strips are sandwiched intermediate the relatively thin cover sheet and the relatively thick sheet of cushioning material. The relatively thin cover sheet and sheet of cushioning material are adhered or bonded to at least a portion of the spaced strips along their lengths such that the entire composite is retained together.

In one aspect of the invention, the spaced strips are formed from material which bonds or adheres itself to the cushioning material and thin cover sheeting without the application of adhesive when heated or at an elevated temperature such that the entire laminate will be positively retained together when the strips are inserted between the cushioning material and cover sheet.

In another aspect of the invention, the relatively thin sheet of covering material includes a plurality of fibers retained together in a nonwoven fashion to form a relatively closed sheet applied over the strips and to one surface of the cushioning material to resist passage of dust, dirt, and other particles therethrough.

In other aspects of the invention, and especially the method for manufacturing the structural laminate, the self-adhering strips are combined at an elevated temperature with the cushioning material and thin cover sheeting and forced together with those materials and sheeting into a composite laminate. After such combination, the composite laminate is cooled such that the materials are retained together and the laminate sets in a predetermined orientation, preferably flat and planar. When so formed, the laminate includes an inherent resiliency such that even if rolled for storage and/or transportation after manufacture, the laminate will return to the predetermined orientation when unrolled.

The present invention, therefore, provides distinct advantages over prior known upholstery cushioning materials. The laminate eliminates the necessity of using additional dust covering or scrim material beneath seating, upholstery, or furniture because the thin cover sheeting prevents particles from dropping from the upholstery as well as helping to retain the laminate together. The laminate can be easily cut with scissors for use in making upholstery and yet is sufficiently resilient to provide adequate support as well as resistance to wear caused by the upholstery springs. Further, it is sufficiently bendable and not overly stiff to cause discomfort during seating. The self-adhering strips are preferably formed from an organic polymer in the shape of a cylindrical cord and are noiseless even when rubbing against wire springs.

The manufacture of the laminate is considerably easier since it avoids the use of all glue or adhesive during assembly because of the self-adhering nature of the strips. Moreover, the laminate retains a built-in resiliency and memory such that it is not difficult to use.

These and other objects, advantages, purposes, and features of the invention will become more apparent from a study of the following description taken in conjunction with the drawings.

BRIEF DESCRIPTION OF THE DRAWINGS

FIG. 1 is a perspective view, with portions broken away, of an upholstered chair incorporating the present invention and illustrating a typical environment for the use of the invention;

FIG. 2 is a fragmentary, perspective view of the structural laminate of the present invention with portions broken away;

FIG. 3 is a fragmentary, side sectional view of the structural laminate taken along plane III—III of FIG. 2; and FIG. 4 is a schematic illustration of the apparatus utilized for producing the structural laminate of the present invention.

DESCRIPTION OF THE PREFERRED EMBODIMENTS

Referring now to the drawings in greater detail, FIG. 1 illustrates an upholstered chair 10 having a portion broken away to illustrate its internal construction. The chair includes a frame 12 supporting a plurality of coil springs 14 positioned on their axial ends and tied together with other such springs for compression when a person sits thereon. Over top the plurality of springs is laid the structural laminate 20 of the present invention followed by a covering material 15 and a finished cushion or the like 16 thereover. With prior known cushioning pads, it has been necessary to use a lower covering or scrim sheet beneath the springs 14 and frame 12 at position A (shown in FIG. 1) to prevent particles of material from dropping out of the upholstered article. The present invention eliminates the need for such a scrim or cover sheet. Typically, the structural laminate 20 is held in place by metal hog-rings passing through the laminate and secured to the springs therebeneath. Thus, the structural laminate serves both as an insulator to separate the cushion 16 from the protruding effect of the plurality of springs 14 as well as a padding or cushioning material helping to make the seat more comfortable.

As is best seen in FIGS. 1-3, the structural laminate 20 basically comprises three components including a cushioning layer 22, a thin sheet of nonwoven covering material 24, and a plurality of relatively closely spaced, preferably generally parallel, stiffening or reinforcing strips 26 of a self-adhering nature intermediate the cushioning material and thin covering sheet. As will be more fully explained below, stiffening strips 26 are formed from a material which becomes sticky or tacky and thus self-adhering when heated to an elevated temperature. These strips are fed intermediate the cushioning material and sheet of covering material and thereafter the three separate elements are compressed together and cooled to form the composite and to retain the stiffening strips in their proper spacing.

Preferably, the cushioning sheet material 22 is a cotton-flote or other similar, resinated cotton fibrous batt. Other materials such as foam rubber, fiberglass batt, wool batt, and the like can also be used. Preferably, the cotton flote is a blend of cotton linters made from high grade cotton obtained from the extraction of cottonseed or oil from cotton hulls to produce short fibers. The fibers are generally in the range of one-half to one and one-half inches long and can be blended with from 10 to 20 percent synthetic fibers. Also, the cotton batt is preferably impregnated with a fire-retardant chemical or resin which reduces fire hazard and also tends to hold the batt together. An example of cotton flote of the type which may advantageously be used in the present invention is disclosed in U.S. Pat. No. 3,181,225 entitled PROCESS OF RESIN TREATING A COTTON BATTING issued May 4, 1965, and invented by N. B. Knoepfler et al.

The thickness of the cushioning sheet layer 22 can vary depending on the end use but will generally be in the range of ¼ to 2 inches in thickness. The material functions as a cushion or insulator between the springs typically used in an upholstered seat or piece of furniture and the finished cushion or seating laid over top.

As shown in FIGS. 2 and 3, the relatively thin sheet of covering material 24 includes closely spaced fibers such that the sheet provides an efficient dust or dirt particle barrier to prevent dust and particles of the upholstery or fibers from the cotton-flote from falling out of the upholstered seat. Sheeting 24 is adhered or bonded to the circumferential portions of stiffening strips 26 along their entire length. Preferably, however, the sheet material 24 abuts but is not securely fastened to the surfaces of the cushioning material 22 adjacent either side of and intermediate the stiffening or reinforcing strips. Accordingly, the stiffening strips provide the attaching means for holding the cover 24 over the surface of the cushioning material to which the stiffening strips are retained. Fastening in this manner helps the cover sheet 24 retain the stiffening strips in their proper spacing.

Preferably, the covered sheet 24 is formed from a spun-bonded material including fibers of polyester. A specific example of spun-bonded polyester material in thin sheet form found useful in the present invention is a product sold under the trademark "Reemay" manufactured and distributed by I. E. DuPont de Nemours and Company. The spun-bonded polyester sheeting has been found to be very durable when used in seating applications and yet is significantly stronger and less expensive than prior known nettype or woven materials used in upholstering. The spun-bonded polyester provides an excellent yield per pound used as compared to woven, net materials and is highly compatible with the preferred polypropylene stiffening strips, cords, or rods which are of the self-adhering nature as explained below. Other sheet materials which may be used other than spun-bonded polyester include spun-bonded polypropylene sold under the trademark "Typar" by DuPont, spun-bonded polyethylene, nonwoven fiberglass cloth, or dense, nonwoven, calendered fabric materials.

As shown in FIG. 1, the structural laminate 20 is assembled in a chair or other seating or furniture by laying it the top of the springs 14 such that sheeting 24 contacts the springs with stiffening strips 26 immediately adjacent thereto. The stiffening strips provide resiliency and reinforcement for the structural laminate and prevent the springs from projecting or protruding through the insulating laminate into the finished cushion supported thereon. Strips or rods 26 are each sufficiently resilient and bendable to give when bearing a load but are not so stiff as to cause discomfort to a person seated on an upholstered seat formed therewith. Preferably, strips 26 are solid rods of circular cross section and formed from organic polymer. It has been found that polypropylene provides the best characteristics in that it combines excellent bending and resiliency characteristics and is yet not too stiff to be uncomfortable. Other possible materials for strips 26 include nylon and polyethylene. The size of the stiffening strips 26 depends on the support and stiffness required in the ultimate product in which the structural laminate will be used. For greater stiffness, a larger diameter stiffening rod may be incorporated in the laminate 20. Conversely, for more bendable, less stiff applications, a smaller diameter stiffening rod may be used. The polypropylene strips have been found to be excellent in use since they are durable and are highly resistant to the wear caused by rubbing against the steel springs and other hardware within the seat. Moreover, they have excellent recovery as well as flexibility. Typically, the strips will be placed at intervals of ¾ to 3 inches apart although the spacing may be varied according to the spacing of the springs in the various seating applications. Other orientations for the strips 26 may be employed such as zig-zag or criss-crossed arrangements.

An important aspect of the stiffening strips used in the present invention is the fact they are self-adhering. When heated, the material from which they are formed becomes tacky or sticky so that it may be easily combined and retain together the other elements of the structural laminate. As will be explained below, the strips are heated to an elevated temperature or alternately extruded and fed at the elevated temperature caused by extrusion directly into the apparatus which combines them with the cushioning and thin covering layers. The materials are compressed together and allowed to cool in a predetermined orientation. The self-adhering nature of the strips causes them to be securely retained to the surface of the cotton flote or other cushioning material as well as to the surface of the thin sheet covering material 24. Hence, no adhesives need be applied to the stiffening strips or the other layers of material during manufacture and a costly, time-consuming, messy, and difficult step to control in the prior known processes for manufacturing upholstery laminates is thereby eliminated.

The resulting structural laminate has the resiliency and durability of a laminate formed with metallic wire and yet is bendable to provide seating comfort and may be easily cut with scissors or a knife to provide ease in using the laminate during the assembly of an upholstered seat. Like the cotton flote material, the polypropylene stiffening strips can be treated with a fire-retarded chemical. The spun-bonded polyester cover sheeting 24 will melt should it encounter flame but it will not burn with an open flame. Strips in cross-sectional shapes other than the illustrated, circular cross section may also be utilized such as flat, elliptical, rectangular, or other shapes. However, each will be self-adhering as described above to provide the enumerated advantages.

Referring now to FIG. 4, which discloses a preferred method for forming the structural laminate, the method basically comprises providing the self-adhering, stiffening, or reinforcing strips 26 and inserting them in a self-adhering state into place between layers of the cushioning material 22 and thin covering material 24. The self-adhering state for the strips 26 is provided by bringing the strips to, or causing them to be at, an elevated temperature relative to their normal temperature in which they are not self-adhering.

The strips or rods 26 may be preformed and unwound from a roll or reel of polypropylene cord or rod and passed through appropriate feeding apparatus which maintains the proper spacing for the strips or rods in the finished laminate. The strips or rods 26 are combined with the cushioning material 22 and relatively thin covering sheet material 24 by inserting the strips in the desired spacing between surfaces of the two layers of material after heating the strip or when the strip is at an elevated temperature. For polypropylene, it has been found useful to heat the strips to approximately 325° F. when the rods become sticky or tacky while keeping the period of heating to a minimum to prevent the strips from being melted, broken, or having their structural characteristics destroyed. At normal or ambient temperatures of 65° to 75° F., the polypropylene strips are not sticky or tacky and thus not self-adhering.

Alternately, the polypropylene cords or rods 26 may be extruded simultaneously from an extruder with the extrusion process producing the cords or rods at an elevated temperature such that they are self-adhering as they leave that apparatus.

The heated, self-adhering strips or rods are inserted in their desired spacing between the layers of cushioning and covering material and compressed or forced together therewith such that the cushioning material and covering strips adhere to the tacky or sticky surfaces of the cord while the cord becomes at least partially embedded in the cushioning material as is shown in FIG. 3. The compression force tightly adheres the various materials together.

Simultaneously with the compression or forcing together or thereafter, the entire laminate is returned to ambient or room temperature (65°–75° F.) causing the self-adhering cord to immediately cool and set up or bond itself to the other layers. Preferably, the cooling from the elevated temperature takes place with the laminate being maintained in a preferably planar or flat orientation. Hence, the completed laminate will be planar and yet will be sufficiently resilient to return to the planar orientation even after unwinding from a reel or the like on which the laminate has been placed for transportation or storage. Although it is preferred that the laminate be formed in a planar orientation since such orientation allows application in both planar and curved seating or furniture applications, it would be possible to contour the laminate to a specific curvature or configuration by cooling it in that specific configuration. It would return to that specific configuration upon unwinding from a roll, reel, or other storage apparatus.

Accordingly, it will be understood that the present invention provides a structural laminate extremely useful for making upholstered seating, furniture, and the like which can be easily cut to size for use in such seating and is easily and cheaply manufactured without the use of adhesives which were necessary to form prior known structures. Moreover, the laminate is durable and wear resistant and eliminates the necessity for use of the typical covering scrim often previously used beneath upholstery. The several preferred materials utilizing organic polymers avoid annoying noise when in contact with the typical metal springs used in upholstery.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. A structural laminate useful in making upholstered seats, furniture, and the like comprising:
   a sheet of cushioning material;
   a plurality of spaced, bendable, yet relatively stiff and resilient, elongated, self-adherent, organic polymer strips which become adhesive at elevated temperatures and are bonded to one surface of said sheet;
   a relatively thin, relatively closed sheet of nonwoven covering material selected from the group comprising spun-bonded polyester, polyethylene, polypropylene, fiberglass cloth and dense, calendered fabric, said covering material applied over said spaced, self-adherent strips and said one surface of said cushioning material such that said strips are intermediate said cushioning material and covering sheet;
   said strips being bonded along their lengths to said sheet of cushioning material and to said sheet of covering material without the use of additional adhesive material such that said covering and cushioning sheets are adhered together only by said spaced strips.

2. The structural laminate of claim 1 wherein said strips are formed from an organic polymer which becomes tracky or sticky when heat is applied or the strips are at an elevated temperature.

3. The structural laminate of claim 1 wherein said strips are generally parallel to one another and are impressed only partially into the surface of said cushioning material along their lengths.

4. The structural laminate of claim 1 wherein said strips are elongated cords each having a generally circular cross-sectional shape.

5. The structural laminate of claim 4 wherein said cords are formed from an organic polymer which becomes tacky or sticky when heat is applied or the cords are at an elevated temperature.

6. The structural laminate of claim 5 wherein said cords are formed from polypropylene.

7. The structural laminate of claim 4 wherein said nonwoven covering sheet of material has a sufficiently closed porosity to resist the passage of dust, dirt, and other particles therethrough.

8. The structural laminate of claim 7 wherein said cushioning material is a resin-impregnated pad of fibrous cotton flote or batt.

9. The structural laminate of claim 1 wherein said nonwoven covering sheet of material has a sufficiently closed porosity to resist the passage of dust, dirt, or other particles therethrough.

10. A structural laminate useful in making upholstered seats, furniture, and the like comprising;
    a sheet of cushioning material;
    a plurality of spaced, bendable, yet relatively stiff and resilient, elongated strips bonded to one surface of said cushioning sheet, said strips formed from organic polymer material which becomes adhesive at elevated temperatures; and
    a relatively thin, covering sheet of nonwoven material comprising fibers retained together in a nonwoven fashion to form a relatively closed sheet applied over said strips and said one surface of said cushioning material, said nonwoven sheet selected from the group comprising spun-bonded polyester, polyethylene, polypropylene, fiberglass cloth and dense, calendered fabric, resisting the passage of dust, dirt, and other particles therethrough, and being bonded to said strips with said strips being intermediate said covering sheet and cushioning material;
    said strips being bonded and adhered along their lengths to said cushioning sheet and nonwoven covering sheet when in said adhesive condition without the use of additional adhesive material such that only said strips retain said cushioning and covering sheets together as said laminate; said strips being of sufficient size and resiliency to provide strength, support, and wear resistance for said laminate yet being sufficiently flexible to bend under load for comfort in seating and other applications.

11. The structural laminate of claim 10 wherein said strips are formed from an organic polymer which becomes tacky or sticky when heat is applied or the strips are at an elevated temperature.

12. The structural laminate of claim 11 wherein said strips are cords having a generally circular cross-sectional shape, said cords being generally parallel to one another and at least partially impressed into the surface of said cushioning material along their lengths.

13. The structural laminate of claim 12 wherein said cushioning material is a resin-impregnated pad of fibrous material.

14. The structural laminate of claim 1 wherein said cushioning material is selected from the group comprising cotton fibrous batt, foam rubber, fiberglass batt and wool batt.

15. The structural laminate of claim 10 wherein said cushioning material is selected from the group comprising cotton fibrous batt, foam rubber, fiberglass batt and wool batt.

16. The structural laminate of claim 15 wherein said cushioning material is a resin-impregnated pad of cotton fibrous flote or batt.

* * * * *

UNITED STATES PATENT AND TRADEMARK OFFICE
CERTIFICATE OF CORRECTION

PATENT NO. : 4,076,886
DATED : February 28, 1978
INVENTOR(S) : JACK C. CORCORAN

It is certified that error appears in the above-identified patent and that said Letters Patent are hereby corrected as shown below:

Column 1, Line 14:

"coverng" should be --covering--.

Column 4, Line 43:

"nettype" should --net-type--.

Column 7, Line 28:

"tracky" should be --tacky--.

Signed and Sealed this

Third Day of October 1978

[SEAL]

Attest:

RUTH C. MASON
Attesting Officer

DONALD W. BANNER
Commissioner of Patents and Trademarks